United States Patent
Nicolas et al.

(10) Patent No.: US 8,451,441 B2
(45) Date of Patent: May 28, 2013

(54) METHOD FOR CALIBRATING A DEVICE FOR OPTICAL CURVATURE MONITORING

(75) Inventors: Yann Nicolas, Grenoble (FR); Philippe Lembeye, Montigny (FR)

(73) Assignee: Technip France (FR)

( * ) Notice: Subject to any disclaimer, the term of this patent is extended or adjusted under 35 U.S.C. 154(b) by 228 days.

(21) Appl. No.: 13/125,602

(22) PCT Filed: Oct. 22, 2009

(86) PCT No.: PCT/FR2009/052023
§ 371 (c)(1),
(2), (4) Date: Apr. 22, 2011

(87) PCT Pub. No.: WO2010/046602
PCT Pub. Date: Apr. 29, 2010

(65) Prior Publication Data
US 2011/0199608 A1    Aug. 18, 2011

(30) Foreign Application Priority Data
Oct. 24, 2008  (FR) .................................. 08 05942

(51) Int. Cl.
*G01B 11/16* (2006.01)
*G01J 1/10* (2006.01)

(52) U.S. Cl.
USPC ................. 356/243.1; 356/241.4; 385/12

(58) Field of Classification Search
USPC ............. 356/243.1–243.6, 241.1–241.6, 32, 356/35.5; 382/12, 13, 37
See application file for complete search history.

(56) References Cited

U.S. PATENT DOCUMENTS
2003/0056954 A1 * 3/2003 Headworth ................... 166/302

FOREIGN PATENT DOCUMENTS

| | | | |
|---|---|---|---|
| DE | 3507514 | * | 9/1986 |
| EP | 1635034 A | | 3/2006 |
| FR | 2867561 A | | 9/2005 |
| FR | 2871511 A | | 12/2005 |
| JP | 62-006138 A | | 1/1987 |
| WO | WO 98/41815 A | | 9/1998 |
| WO | WO 2005/088375 | | 9/2005 |
| WO | WO-2006003308 | * | 1/2006 |
| WO | WO 2006/021751 | | 3/2006 |

OTHER PUBLICATIONS

International Search Report dated Feb. 9, 2010, issued in corresponding international application No. PCT/FR2009/052023.
R. Roberts et al. "Fatigue Monitoring of Flexible Risers Using Novel Shape Sensing Technology", Reference OTC19051, Offshore Technology Conference, pp. 1-5 (2007).

* cited by examiner

Primary Examiner — Hoa Pham
(74) Attorney, Agent, or Firm — Ostrolenk Faber LLP (57) ABSTRACT

A method for calibrating a device for monitoring the curvature of a stiffener (18) of a flexible sea line: A monitoring device has a deformable rod (26) having a central axis (C) and at least three optical sensors (29, 30, 31) maintained pressed against the perimeter of the rod (26). The method includes the steps, for different consecutive orientations of bending planes around the central axis; bending the rod (26) according to the same curvature radius; measuring the deformation of the sensors (29, 30, 31) during the bending; using the measured deformations to extrapolate a sine function of the deformation for each sensor according to the orientation of the bending plane; calculating error-correction coefficients according to the angular shift between the extrapolated sine functions and according to the amplitude of the extrapolated sine curves.

12 Claims, 5 Drawing Sheets

METHOD FOR CALIBRATING A DEVICE FOR OPTICAL CURVATURE MONITORING

CROSS-REFERENCE TO RELATED APPLICATIONS

The present application is a 35 U.S.C. §§371 national phase conversion of PCT/FR2009/052023, filed Oct. 22, 2009 which claims priority of French Application No. 0805942 filed Oct. 24, 2008, the contents of which are incorporated by reference herein. The PCT International Application was published in the French language.

BACKGROUND OF THE INVENTION

The invention relates to the field of optically monitoring deformation, and in particular, checks on structures such as marine flexible pipes or constructions.

Marine flexible pipes are usually used for transporting hydrocarbons extracted from offshore sources. Such pipes are notably described in the standard document API RP 17B "Recommended Practice for Flexible Pipe" published by the American Petroleum Institute. Flexible risers connect a sea bed installation, for example a well head or a header, resting on the sea bed, to a surface installation, for example a floating production unit. A flexible riser has to be able to endure great mechanical stress, notably the stress generated by its own weight, by the internal and external pressures, and by the variations in curvature or bend radius caused by the movements of the surface installation under the effect of the swell and marine currents.

One known solution for reducing the dynamic stresses endured by such risers is to use bend stiffeners that form sleeves and can be fitted around them in order to stiffen them and limit their curvature in the critical zones, notably in their upper part near the surface installation. According to one particular application of these bend stiffeners to risers, they have an upper end secured to the surface installation by means of a flange and extend along the length of the riser over a variable length. The flexible pipe is fitted coaxially into the bend stiffener. Thus, despite the effects of the swell and of the marine currents near the surface, the flexible pipe maintains a radius of curvature which is markedly higher than its minimum acceptable bend radius MBR (which stands for minimum bend (or bending) radius), and thus does not become damaged. These bend stiffeners can also be fitted over portions of pipe near the sea bed in order, once again, to limit their curvature.

Because these bend stiffeners are highly stressed essential components, it is necessary to ensure that they remain intact for a service life which may exceed 20 years. Thus has been conceived the idea of systematically recording the deformations of these bend stiffeners using monitoring devices inserted into their thickness in order to check that they are operating correctly. These measurements can also serve to determine the cumulative dynamic stresses to which the pipe or the bend stiffener has been subjected over the course of time, with a view to estimating its fatigue condition.

Document WO 2005-088375 discloses a device for monitoring the bending of a structure. This monitoring device comprises a deformable rigid rod having a central axis of revolution. The central rod is typically made of glass fiber reinforced epoxy resin. The deformable rigid rod is equipped with three optical deformation sensors which are distributed about and fixed to its periphery. The optical sensors comprise optical fibers which are parallel to the rod and equipped with photo-etched Bragg gratings behaving like optical deformation gages. The three Bragg gratings have identical lengths of the order of a few millimeters. All three are situated on the same axial side along the rod, that is to say that their three centers are included within one and the same plane perpendicular to the axis of the rod. The optical fibers are housed in grooves formed at the periphery of the rod. An optoelectronic device connected to these three sensors can be used to measure the wavelengths reflected by the Bragg gratings and from this deduce the three axial deformations $\epsilon a$, $\epsilon b$, $\epsilon c$ experienced by the three optical fibers at said three Bragg gratings. Once these three axial deformations have been measured in this way, it is possible from these measurements by calculation to deduce the three unknowns which are the radius of curvature $\rho$ of the deformable rigid rod in the region of the three Bragg gratings, the angular orientation $\psi$ of the plane of bending with respect to the deformable rigid rod, and finally, the uniform axial elongation $\epsilon$ experienced by the deformable rigid rod, said uniform axial elongation being the result for example of external tensile/compressive stresses or thermal expansion phenomena. This calculation, which is detailed on page 29 of the abovementioned document, also involves parameters assumed to be known regarding the geometry of the deformable rigid rod and of the sensors, and notably relating to the relative position of the three Bragg gratings with respect to the axis of the deformable rigid rod.

The deformable rigid rod equipped with the sensors of such a monitoring device may be embedded within the thickness of a bend stiffener in a part liable to flex, and parallel to the axis of the bend stiffener and to the pipe. Thus, when the flexible pipe is in service, the movements of the bend stiffener cause the deformable rigid rod to flex and thus the sensors supply signals representative of the curvature of the stiffener. On the basis of these signals, the orientation of the plane of bending of the rod and the radius of curvature are calculated. These data can then be processed in real time, for example to trigger an alarm if the radius of curvature or bend radius drops below a predefined critical threshold value or may be logged for later processing, for example in order to estimate fatigue damage and remaining life expectancy.

Such devices are notably described in documents FR2871511, WO2006-021751 and in the publication "Fatigue Monitoring of Flexible Risers Using Novel Shape-Sensing Technology", reference OTC19051, Offshore Technology Conference, Houston, Apr. 30 to May 3, 2007, which documents also disclose the use of deformable rigid rods of geometries other than cylindrical, for example of octagonal or triangular geometries.

In the publication OTC19051, the deformable rigid rod comprises four optical deformation sensors of the Bragg grating type, the fourth having been added in order to create redundancy. That publication also discloses, on page 2, a method for the calculation of the curvature of the orientation of the plane of bending from the four axial deformations $\epsilon 1$, $\epsilon 2$, $\epsilon 3$, $\epsilon 4$ measured. This method of calculation also involves the relative position of the four Bragg gratings with respect to the axis of the deformable rigid rod.

The bend radii applied to the bend stiffeners vary in practice between a few meters and infinity. In practice, it is necessary for the deformable rigid rods that measure curvature and with which these bend stiffeners are fitted to be able to measure, with accuracy, bend radii $\rho$ greater than 3 m. Because the curvature Cu is the inverse of the radius of curvature or bend radius (Cu=1/$\rho$), either one of these two magnitudes could be considered, although it is simpler to use the curvature when dealing with the problems of measurement accuracy. The measurement range for curvature is therefore from 0 to 0.33 m$^{-1}$. The required accuracy for curvature measurement for this application has typically to be better than +/−0.0015 m$^{-1}$, this level of accuracy being needed in order to perform fatigue damage analysis.

In addition, to facilitate the manufacture, storage, transport and installation of these deformable rigid rods, which may have an overall length in excess of several tens of meters, it is desirable for these to be able to be wound up with a minimum radius of curvature of the order of 0.5 to 1 m. Now, the optical fibers with which the deformable rigid rods are equipped must not be subjected to relative elongations in excess of 0.5% because if they are, there is a risk that they will become damaged. This is why the deformable rigid rods intended to be fitted to the bend stiffeners of offshore flexible pipes in practice have a small diameter, typically of the order of 5 mm to 10 mm, which makes it possible to reduce the maximum elongations experienced by the optical fibers when the deformable rigid rod is bent to its minimum bend radius (see page 25 of WO 2005-088375). This small diameter does, however, have the disadvantage of contributing toward reducing the accuracy of the curvature measurements, so that the objective of accuracy to within +/−0.0015 m$^{-1}$ is, in practice, particularly difficult to achieve when the diameter of the deformable rod is of the order of 10 mm or less.

Another aggravating factor in terms of this measurement accuracy problem is that the deformable rigid rod is made of glass fiber reinforced resin, which means that not-insignificant spread is introduced into various geometric parameters: the diameter of the rod, the shape of the grooves, the angular offset between the optical fibers, the distance between the optical fibers and the central axis of the rod, etc. Using epoxy resins to fix the optical fibers to the periphery of the rod also generates stresses which can become the root cause of measurement errors. Such composite materials, because of their method of manufacture, generally have mediocre dimensional tolerances, of the order of plus or minus a few tenths of a mm. These mediocre tolerances also give rise to errors which are all the greater, the smaller the diameter of the rod. Thus, in practice, in the case of a deformable glass fiber rigid rod of 10 mm diameter, it has been found that the error on the curvature measurement can often exceed +/−0.003 m$^{-1}$, and this is not satisfactory.

One first solution for solving this problem is systematically to test the measurement accuracy of each deformable rigid rod after it has been manufactured, and to keep only those which achieve the required level of accuracy. However, this solution gives rise to a high scrappage rate and is not economically viable.

A second solution is to produce the deformable rigid rod from a metal section piece with a high elastic limit, that has been shaped with a high level of accuracy, for example a titanium section piece obtained by cold drawing and which has dimensional tolerances to within one hundredth of a millimeter. However, this solution is not very economically attractive.

A third solution for solving this problem is to increase the diameter of the deformable rigid rod, as taught in publication OTC19051, that document proposing a diameter of 75 mm. This solution improves the measurement accuracy for large bend radii. However, it has the disadvantage of increasing the minimum bend radius that the deformable rigid rod can tolerate without the risk of damage to the optical fibers, and this on the one hand poses problems regarding the storage and handling of said rod, and on the other hand prevents small bend radii from being measured. In practice, a deformable rigid rod with a diameter of 75 mm ought to be stored on 15 m diameter reels and could not be used, without the risk of premature fatigue failure, for durably measuring bend radii smaller than 15 m to 20 m, these being radii that the bend stiffener is likely to reach only in very heavy weather or storm conditions.

SUMMARY OF THE INVENTION

The invention seeks to solve this problem of the accuracy with which the curvature can be measured, while at the same time avoiding the aforementioned disadvantages. The invention thus relates to a method of calibrating a device for monitoring the curvature of a marine flexible pipe bend stiffener, this monitoring device being equipped with a deformable rod that has a central axis, and with at least three optical sensors kept pressed against the periphery of said rod, comprising the steps involving:

for various successive orientations of planes of bending about said central axis:
bending the rod to the same bend radius;
measuring the deformation of the sensors during the bending;
extrapolating from the measured deformations, a sinusoidal function of the deformation for each sensor as a function of the orientation of the plane of bending;
calculating error correction coefficients as a function of the angular offset between the extrapolated sinusoidal functions and as a function of the amplitudes of the extrapolated sinusoidal curves.

According to an alternative, the calculating of the error correction coefficients involves calculating the actual positions of the at least three optical sensors with respect to the central axis as a function of the amplitudes of the extrapolated sinusoidal curves.

According to another alternative, the rod is returned to a substantially straight position after each bending operation.

According to yet another alternative, the rod is bent by pressing a calibration element of predefined curvature against its periphery.

According to another alternative, the rod is prevented from rotating with respect to its central axis, the calibration element being mounted so that it can rotate about this central axis.

According to another alternative, two supports hold the rod in position, the calibration element being pressed against the rod between the supports, the supports allowing the rod to pivot about two axes which are substantially perpendicular to the central axis of the rod.

According to yet another alternative, each optical sensor comprises a length of optical fiber comprising a Bragg grating and kept pressed against the periphery of the rod.

According to an alternative, the Bragg gratings of the various lengths of fiber are arranged at the same level along the central axis of the rod.

According to another alternative, the bending is applied in the region of said Bragg gratings.

According to another alternative, the extrapolation of the sinusoidal function of a sensor establishes a function of the type:

$$\epsilon_j = A_{j0} + A_{j1}*\cos(\alpha) + B_{j1}*\sin(\alpha)$$

$A_{j1}$ being the phase component and $B_{j1}$ the quadrature component of the fundamental harmonic, these components being determined by a Fourier series method on the basis of the deformation measurements, α being the orientation of the plane of bending about the central axis.

According to another alternative, at least one harmonic of a rank higher than the fundamental harmonic is determined by a Fourier series method, and the deformation measurements are repeated if the ratio between the higher rank harmonic and the fundamental harmonic exceeds a threshold value.

BRIEF DESCRIPTION OF THE DRAWINGS

Other features and advantages of the invention will become clearly apparent from the description thereof given hereinafter by way of nonlimiting indication, with reference to the attached drawings in which.

DESCRIPTION OF PREFERRED EMBODIMENTS

The invention proposes a method of calibrating a device for monitoring the curvature of a structure, notably a construction or an underwater pipe bend stiffener. This monitoring device is equipped with a deformable rod that has a central axis and with at least three optical sensors held against the periphery of the rod. The invention proposes to apply bendings at the same bend radius but in different planes of bending to the deformable rod. From the deformation measured by the sensors, sinusoidal functions of the deformation as a function of the plane of bending are extrapolated, in order to deduce optical sensor error correction coefficients.

The calculation of the error correction coefficients may notably involve calculating the actual positions of the at least three optical sensors with respect to the central axis C. This method of calibration therefore makes it possible accurately and nondestructively to determine the main geometric characteristics of the rod that have an influence on the measurement of curvature, particularly the positions of optical sensors such as Bragg gratings with respect to the central axis C of the rod. Calculating the actual positions of the sensors is advantageous in order to take account of any non-linear behavior in the deformation of the optical sensors as a function of the curvature of the rod. This non-linear behavior is particularly pronounced when the deformable rod has mediocre dimensional tolerances. Calculating the actual positions of the optical sensors thus makes it possible to create an accurate geometric model of the deformable rod and of its sensors.

Thus, even if the deformable rod has mediocre dimensional tolerances, that is to say if there are significant discrepancies between, on the one hand, the nominal dimensions on the drawings and, on the other hand, the actual dimensions following manufacture, it nonetheless remains possible to obtain a measurement of curvature that exhibits good accuracy. The measurement accuracy will be notably better if the calculated actual dimensions are reused rather than using the nominal dimensions when calculating the curvature as a function of the elongation measurements, as will be detailed later on. The invention therefore makes it possible to reduce the instrumented deformable rod reject rate, to keep a method of manufacture and of installation that is economical, and to keep a sensor of small diameter capable of measuring small bend radii, while at the same time greatly improving the accuracy on the curvature measurement, even for large bend radii.

Figure 1:
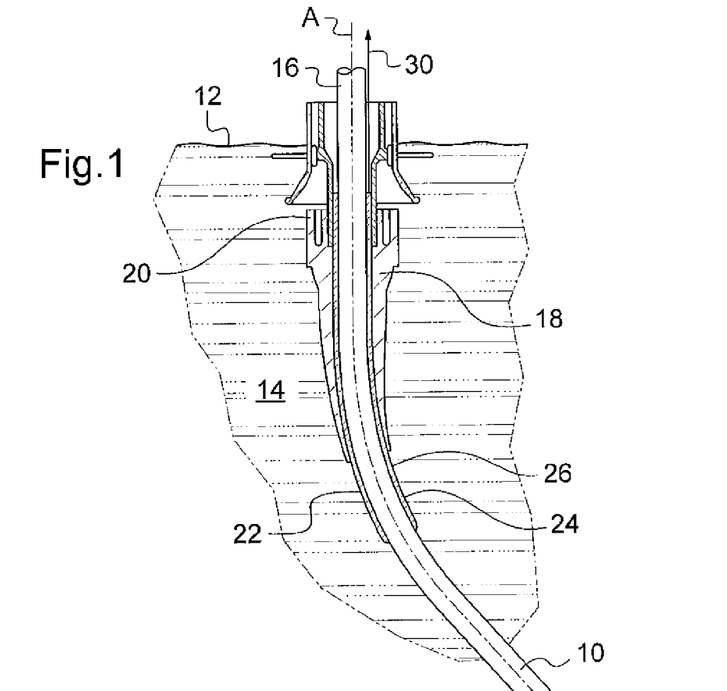
FIG. 1 is a side view in cross section of a flexible pipe equipped with a bend stiffener where it joins to a surface station.

FIG. 1 shows a flexible pipe 10, commonly known as a riser, which runs substantially vertically from the surface 12 to the sea bed 14. This flexible pipe 10 has a surface end 16 which is secured to a surface installation, not depicted. Moreover, this surface end 16 is pushed into a bend stiffener 18, the upper end 20 of which is kept in a fixed position on a platform and the lower end 22 of which extends around the pipe 10 toward the sea bed 14 over a distance of between 5 and 10 meters for example. At rest and when not curved, this bend stiffener 18 has an axis of symmetry A. The bend stiffener 18 serves to limit the amplitude of bending of the pipe 10 near the surface 12. The bend stiffener 18 is typically made of a polymer material, for example polyurethane. The material of the bend stiffener 18 will advantageously be more rigid than the material of the flexible pipe. In FIG. 1, the bend stiffener 18 has an annular cross section which narrows from the upper end 20 toward the lower end 22. Over the entire length of the bend stiffener 18, deformation sensors 24 are installed to monitor both the amplitude of bending of the bend stiffener 18 and the orientation of the plane of bending.

Figure 2:
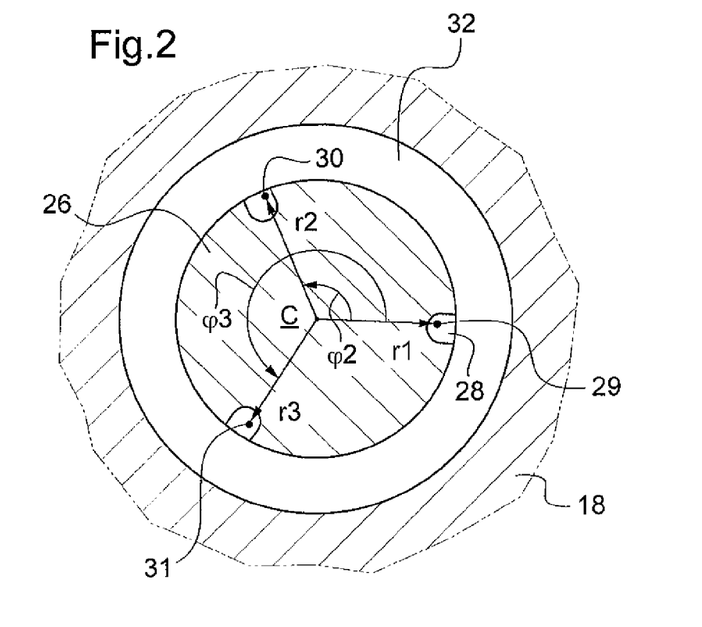
FIG. 2 is a view from above in cross section of the bend stiffener equipped with a monitoring device.

Reference will now be made to FIG. 2 in order to describe a monitoring device associated with the bend stiffener 18. FIG. 2 illustrates, in cross section, a stick 26 that forms a deformable rigid rod. The stick 26 is embedded in the thickness of the bend stiffener 18 down to the vicinity of its lower end 22. This stick 26 has a circular cross section of central axis C. This stick 26 has a diameter of the order of around 10 millimeters or so, for example ranging between 4 and 15 mm. At regular angular intervals around the axis C, longitudinal grooves 28 are formed over the entire length of said stick 26. The longitudinal grooves 28 in this instance are approximately 120° apart.

An optical fiber 29, 30, 31 is held in each of these grooves 28 using a resin, for example an epoxy resin. These optical fibers 29, 30, 31 extend longitudinally over the entire length of said stick 21 which itself extends over the entire length of the bend stiffener 18. Thus, the optical fibers 29, 30, 31 extend from the lower end 22 up to the upper end 20 and beyond where they are connected to signal processing means. Bragg gratings are etched into the optical fibers 29, 30, 31 using a photo-etching technique known per se. Each Bragg grating has a length of the order of a few millimeters and behaves like an optical sensor measuring the elongation of the optical fiber parallel to its main axis. This main axis is also substantially parallel to the central axis C of the stick 26. Each optical fiber is equipped with several Bragg gratings, typically 3 to 10 gratings distributed over the length of the bend stiffener, the remainder of the optical fiber acting as a channel for transmitting the optical signals, according to a well known distributed measurement principle described notably in document WO2005-088375. The optical fibers 29, 30, 31 all have the same number of Bragg gratings, the gratings being distributed in the same way and at the same positions along the three fibers 29, 30, 31. One elementary curvature-measuring zone, viewed in a plane of section perpendicular to the central axis C of the stick 26, has three Bragg gratings perpendicular to said plane of section, these three Bragg gratings being etched on the three optical fibers 29, 30, 31, at identical locations, such that all three of them intersect said plane of section. Thereafter, the stick 26 comprises several elementary curvature-measuring zones, typically 3 to 10 zones, distributed along the length of the bend stiffener.

The stick 26 may be made of glass fiber reinforced composite materials. Such materials are both rigid and flexible and entirely suitable for supporting optical sensors. Further, such materials are able to follow the longitudinal deformations of the bend stiffener 18. The stick 26 may be contained inside a protective sheath.

Considering one of the curvature measurement zones, like the one depicted in FIG. 2, in greater detail, this zone therefore comprises three optical sensors consisting of three Bragg gratings etched onto the three optical fibers 29, 30, 31 and distributed about the periphery of the stick 26. The three sensors make it possible fully to determine, in this measurement zone, the orientation of the plane of bending of the stick 26 and the amplitude of the bending and, as a result, the deformation of the bend stiffener 18. Two of the three sensors are enough fully to determine the plane of bending of the stick 26 and the amplitude of this bending, the third sensor being used to correct the signal supplied by the other two when the stick 26 experiences, in addition to the curvature, a uniform axial deformation of unknown amplitude. This axial deformation of the stick 26 in the bend stiffener 18 is essentially due to friction between the stick 26 and the bend stiffener 18 and/or to effects associated with variations in temperature (thermal expansion).

The position of the three Bragg gratings etched onto the three optical fibers 29, 30, 31, determined with respect to the central axis C in the plane of section of FIG. 2 and expressed in cylindrical coordinates, involves five main dimensions r1, r2, r3, φ2, φ3 involved in measuring curvature. The radii r1, r2, r3 are the distances respectively separating the central axis C from the three fibers 29, 30, 31, these three distances being expressed in the plane of transverse section corresponding to the curvature measurement zone in question. The angle φ2 is the angle between, on the one hand, the segment connecting the central axis C and the first fiber 29 and, on the other hand, the segment connecting the central axis C and the second fiber 30, this angle being measured in the plane of transverse section corresponding to the curvature measurement zone in question. The angle φ3 is the angle between, on the one hand, the segment connecting the central axis C and the first fiber 29 and, on the other hand, the segment connecting the central axis C and the third fiber 31, this angle being measured in the plane of transverse section corresponding to the curvature measurement zone in question.

If the stick 26 were produced perfectly, the actual post-manufacture dimensions would be equal to the nominal dimensions on the drawing: the three radii r1, r2, r3 would be equal, and the two angles φ2 and φ3 would respectively be equal to 120° and to 240°. In this ideal scenario, it is possible accurately to calculate the curvature from, on the one hand, the elongations $\epsilon 1$, $\epsilon 2$, $\epsilon 3$ measured by the three optical sensors 29, 30, 31 respectively and, on the other hand, the aforementioned nominal dimensions of the stick 26. One example of a method of calculation that can be applied to this ideal scenario is detailed on page 29 of document WO2005-088375.

However, in the case of a real stick, the actual post-manufacture dimensions may differ significantly from the nominal dimensions. Thus, as illustrated in FIG. 2, the dimensions r1, r2, r3, φ2 and φ3 are not equal to the nominal values, particularly as a result of the method of manufacture of the stick 26 and, more particularly, as a result of the size of the grooves 28 into which the fibers 29, 30, 31 are bonded. In the case of a glass fiber stick 26 with a mean diameter of 10 mm, the discrepancy between the nominal and actual dimensions may easily exceed 0.2 mm on the radii r1, r2, r3 and 5° on the angles φ2 and φ3. That being the case, using the nominal dimensions rather than the actual dimensions to calculate the curvature from the elongations $\epsilon 1$, $\epsilon 2$, $\epsilon 3$ could give rise to an error in curvature calculation that could easily exceed 0.003 $m^{-1}$. This error associated with the geometry of the stick 26 is unacceptably high for the intended application, especially since this error is cumulated with other measurement errors, notably those relating to the elongation measurements and to the residual stresses.

The errors on the elongation measurement are those of the Bragg gratings and of the associated optoelectronic devices. Present-day techniques are able to achieve a relative elongation measurement that is accurate to around 3 μm/m (that is to say to within $3.10^{-6}$=0.0003%). This error on the elongation measurements in its turn generates an error on the curvature measurements which on the whole is in inverse proportion to the mean diameter of the stick 26. In the case of a stick of diameter 10 mm, the error introduced into the curvatures is of the order of +/−0.0006 $m^{-1}$.

Even when the stick 26 is at rest, with no bending or axial deformation, the optical fibers 29, 30, 31 nonetheless experience residual stresses. These residual stresses are notably introduced into the optical fibers 29, 30, 31 when these are bonded into the grooves 28. The drying of the adhesive notably introduces a preload at rest into the optical fibers 29, 30, 31. These residual stresses give rise to an offset in the elongation measurements performed by the Bragg gratings. This offset may easily exceed 100 μm/m, and therefore introduce very significant curvature measurement errors, typically in excess of 0.01 $m^{-1}$.

One solution for correcting the errors associated with the residual stresses is to measure the three elongations $\epsilon 1r$, $\epsilon 2r$, $\epsilon 3r$ of the three optical sensors 29, 30, 31 when the stick 26 is at rest and lying straight, and then subtract these reference values from the elongation measurements $\epsilon 1$, $\epsilon 2$, $\epsilon 3$ taken in service. This correction does, however, present a practical problem which limits its effectiveness. Specifically, the stick 26 has generally been wound up at the time of its manufacture and transport, which means that it is difficult to lay it out perfectly straight without introducing tension into it, this tension generating stresses which will combine with the aforementioned residual stresses and therefore partially falsify the correction. It is therefore preferable to minimize the tension during the step of measuring the elongations $\epsilon 1r$, $\epsilon 2r$, $\epsilon 3r$ associated with the residual stresses, by using suitable means for keeping the stick 26 in a straight position, for example a support of the straight metal tube type the bore size of which is accurately matched to the outside diameter of the stick. In practice, if such precautions are taken, the error on the curvature measurement which is associated with the residual stresses can be brought down to under +/−0.0005 $m^{-1}$.

Thus, in the case of a glass fiber stick 26 with a diameter of 10 mm, the total error on the curvature measurement can be obtained by summing the various aforementioned errors, namely an error of 0.0005 $m^{-1}$ associated with the residual stresses (after correction), an error of 0.0006 $m^{-1}$ associated with the elongation measurements, and finally, if the nominal dimensions of the stick 26 are used for calculating the curvature, an error associated with the geometric imperfections of the stick 26 which may be as high as 0.003 $m^{-1}$. The total error can therefore, in this case, exceed +/−0.004 $m^{-1}$, and this is not at all satisfactory given that the application is required to be accurate to within +/−0.0015 $m^{-1}$.

The error associated with the geometric imperfections of the stick 26 can be considerably reduced by determining in advance the actual main dimensions of the stick 26, and then by using these actual dimensions rather than the nominal dimensions when performing the curvature calculations. In addition, this method makes it possible to determine the actual main dimensions of the stick 26 with a high level of accuracy, in practice to within a few hundredths of a millimeter, typically within +/−0.02 mm. Thereafter, by using these actual dimensions rather than the nominal dimensions in the curvature calculation, the error associated with the geometric imperfections of the stick 26 can be brought down to a level below +/−0.0005 $m^{-1}$. In this case, the total curvature measurement error can be kept at a satisfactory level of the order of +/−0.0015 $m^{-1}$.

Figures 3, 4:
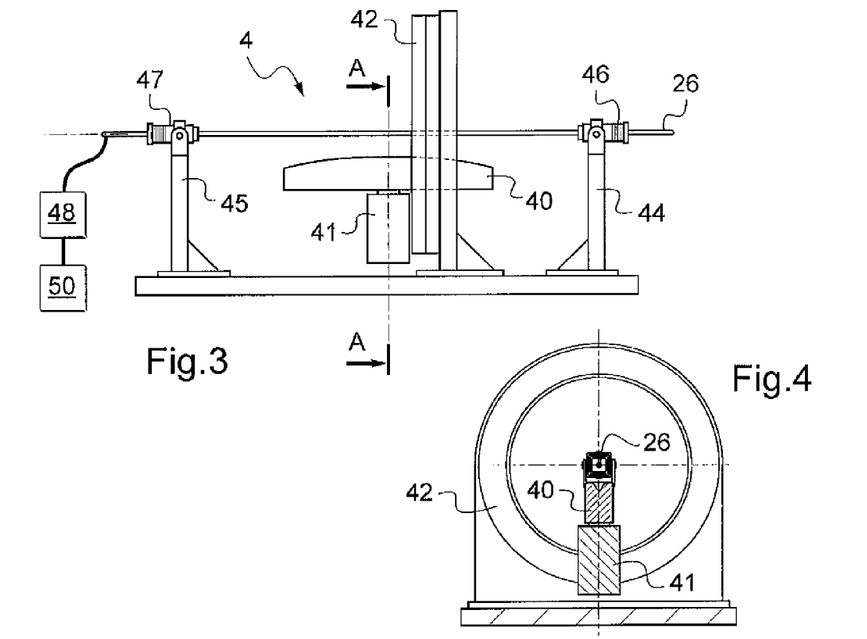
FIG. 3 is a side view of a calibration bench for calibrating the monitoring device, showing a bend standard distant from a rod.
FIG. 4 is a head-on view in cross section of the bench of FIG. 3.
Figures 5, 6:
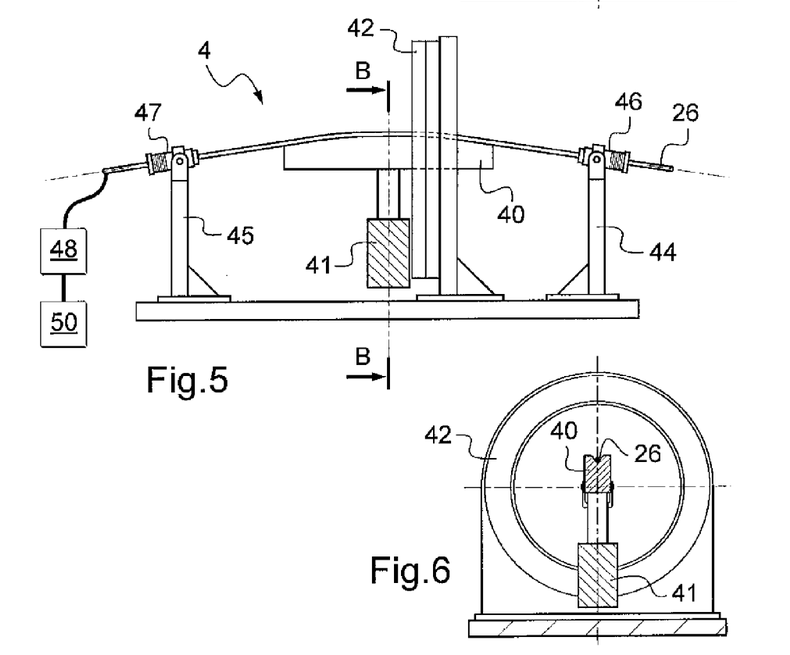
FIG. 5 is a side view of a calibration bench for calibrating the monitoring device, with a bend standard in contact with the rod.
FIG. 6 is a head-on view in cross section of the bench of FIG. 4.

FIGS. 3 and 5 schematically depict a side view of a calibration bench 4 for calibrating the monitoring device. FIGS. 4 and 6 depict this same bench 4 in a head-on view. The calibration bench 4 comprises a calibration element 40 which has a face intended to come into contact with the rod 26. This face has a channel extending with a predefined radius of curvature, for example of the order of 10 meters. This radius of curvature will be small enough to limit the amplitude of calibration errors. The channel is intended to accept the rod 26 in order to apply this radius of curvature or bend radius to it.

The calibration element 40 is mounted on a guide ring 42, so as to describe a circle around the rod 26. The rotation of the calibration element 40 is about the central axis C. The calibration bench 4 comprises distant supports 44 and 45. The calibration element 40 is positioned substantially mid-way between the supports 44 and 45. The calibration element 40 is mounted so that it can rotate on the guide ring 42 via an actuator 41. The actuator 41 allows the calibration element 40 to be moved radially, either to bring it further away from or to press it against the rod 26. The supports 44 and 45 have respective articulations 46 and 47 intended to define the degrees of freedom of the rod 26 with respect to the bench 4. The zone for measuring curvature during calibration, which zone consists of three Bragg gratings formed in three the optical fibers is advantageously positioned near the center of the element 40, mid-way between the supports 44 and 45.

During calibration, the optical fibers of the rod 26 are connected to an optoelectronic device 48 that measures the characteristic wavelengths of the Bragg gratings. The device 48 in real time, from these wavelengths, determines the axial deformation of the Bragg gratings of each of the fibers 29, 30, 31 using a method known per se to those skilled in the art. The measured deformations typically vary between plus or minus 1500 μm/m (+/−0.15%). The device 48 is connected to a computer system 50 so as to record the fiber deformation measurements for the various orientations of the plane of bending. The computer system 50 is equipped with processing means able to extrapolate a sinusoidal function of the deformation of each sensor as a function of the angle of the plane of bending.

In FIGS. 3 and 4, the rod 26 is at rest. The actuator 41 is holding the calibration element 40 away from the rod 26. In FIGS. 5 and 6, the rod 26 has been bent to a predefined radius of curvature or bend radius by the calibration element 40. The actuator 41 is holding the calibration element 40 pressed against the rod 26.

During calibration, the element 40 is brought into various angular positions about the axis C. In each of these angular positions, the element 40 bends the rod 26 so as to apply its bend radius to it. Each angular position of the element 40 corresponds to an orientation of a plane of bending of the rod 26. The element 40 can bend the rod 26 in angular increments. The element 40 may notably apply a bending about the rod 26 every 5, 10 or 20°.

Figure 7:
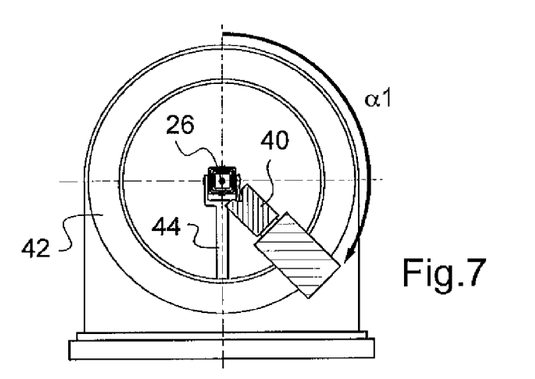
FIG. 7 is a head-on view in cross section of the bench for another angular position of the standard, this standard being distant from the rod.
Figure 8:
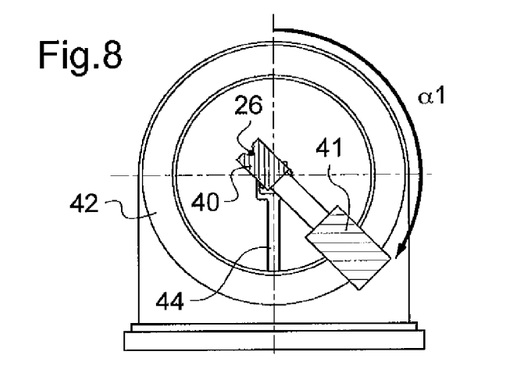
FIG. 8 is a head-on view in cross section of the bench for this angular position of the standard, this standard being in contact with the rod.

In FIGS. 7 and 8, the element 40 is placed in an angular position which is offset with respect to the vertical by an angle $\alpha 1$. In FIG. 8, the element 40 is actuated by the actuator 41 and causes the rod 26 to bend in such a way as to apply its radius of curvature or bend radius to it. The plane of bending of the rod has an inclination of the angle $\alpha 1$. During this bending, the deformations introduced by the bending are measured by the three sensors.

Advantageously, between two successive bendings of the rod 26, the latter is returned to a substantially straight position at rest. This avoids applying torsional forces to the rod 26 which are liable to introduce measurement errors. As illustrated in FIGS. 3, 4 and 7, the element 40 is kept away from the rod 26. As a result, the rod 26 is returned to its position of rest in which it is substantially straight. It is also possible to conceive of the use of a straight template that returns the rod 26 to its position of rest.

In this example, that face of the calibration element 40 that comes into contact with the rod 26 is convex. It is equally possible to conceive of applying the predefined radius of curvature or bend radius by holding the rod 26 in position between the calibration element 40 and a concave standard positioned facing it.

FIGS. 9 to 12 depict the structure of a preferred example of the support 45. This structure is intended to limit the bending moments in the rod 26 at the point where it is held in position with respect to the support 45 while at the same time allowing the rod 26 to rotate about axes perpendicular to its central axis C. The upper end of the support 45 has a forked upper end. The articulation 47 is pivot-mounted between two opposed faces of the fork. The articulation 47 comprises first and second frames 471 and 472. The first frame 471 is mounted so that it can pivot with respect to the support 45 about an axis D substantially perpendicular to the central axis C of the rod 26 at rest. The first frame 471 is mounted so that it can pivot via shafts 473. The rotation of the shafts 473 with respect to the fork may be guided using ball bearings or caged needle bearings in order to limit friction and parasitic stress in the rod 26 as it bends. The second frame 472 is mounted so that it can pivot with respect to the first frame 471 about an axis E substantially perpendicular to the axes C and D when the rod 26 is at rest. The second frame 472 is mounted so that it can pivot via shafts 474. The rotation of the shafts 474 with respect to the first frame 471 may likewise be guided by means of ball bearings or caged needle bearings in order to limit the friction and parasitic stresses in the rod 26 during its bending. The axes C, D and E are secant.

Figure 9:
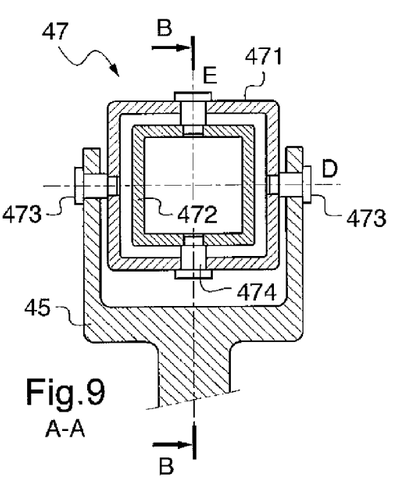
FIG. 9 is a head-on view in cross section of a rod support belonging to the bench.
Figure 10:
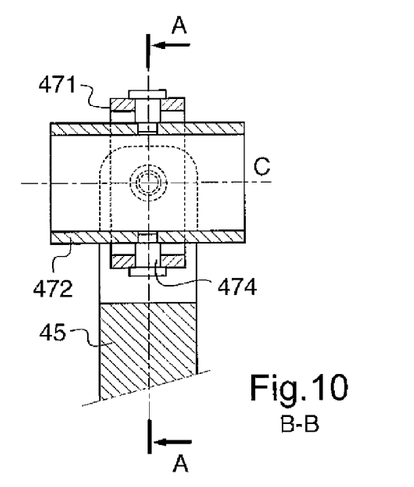
FIG. 10 is a side view in cross section of the rod support of FIG. 9.
Figure 11:
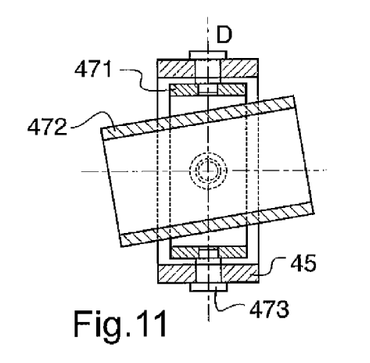
FIG. 11 is a view from above in cross section of the rod support of FIG. 9, during a bending of the rod.
Figure 12:
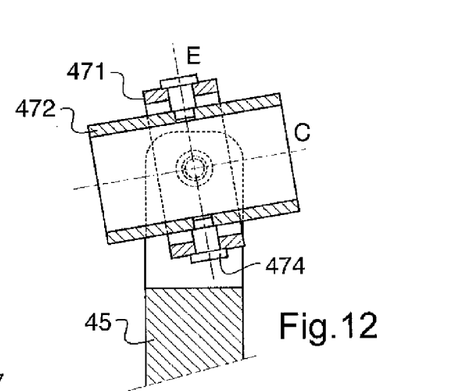
FIG. 12 is a side view in cross section of the rod support of FIG. 9, during another bending of the rod.

In FIGS. 9 and 10, the articulation 47 is placed in its position when the rod 26 is at rest. In FIG. 11, a bending is applied to the rod 26 in a plane of bending including the axis D. In FIG. 12, a bending is applied to the rod 26 in a plane of bending normal to the axis D.

In this embodiment, the element 40 is pressed directly against the rod 26. The rod 26 thus adopts the predefined radius of curvature or bend radius very accurately. However, this method of application may give rise to a small amount of axial tension in the rod 26. To limit that, the support 44 will advantageously have a structure similar to the support 45, allowing the rod 26 to rotate about two axes perpendicular to the central axis C.

Figure 13:
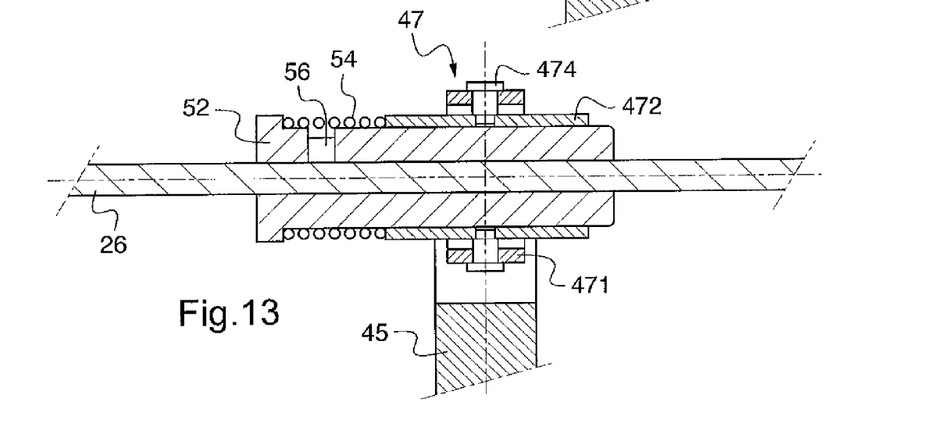
FIG. 13 is a side view in cross section of the support of FIG. 9, equipped with a fastening for the rod, the latter being at rest.
Figure 14:
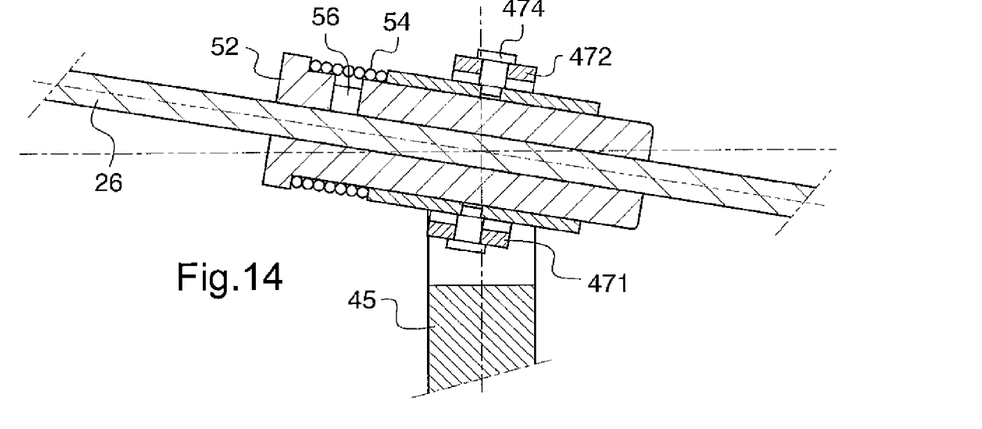
FIG. 14 is a side view in cross section of the support of FIG. 9, equipped with a fastening for the rod, the latter being bent.

FIGS. 13 and 14 depict the support 45 equipped with a sleeve 52 via which the rod 26 is mounted in the articulation 47. The sleeve 52 has a cross section the periphery of which is of substantially rectangular shape. The second frame 472 has a bore of corresponding shape, to prevent any rotation of the sleeve 52 with respect to the second frame 472. The fit between the sleeve 52 and the second frame 472, the surface finish of the sleeve and the material present at its periphery will be chosen so that the sleeve 52 slides with a minimum of friction in the second frame 472 along the central axis C. The sleeve 52 has a longitudinal bore in its middle part. The rod 26 passes through this longitudinal bore.

The sleeve 52 has a member 56 that compresses the rod 26 in order to prevent the latter from rotating about the central axis C. It is also possible to conceive of preventing the rod 26 from rotating about the axis C using other means. In particular, it is possible to conceive of using a sleeve that has a longitudinal groove opening onto the longitudinal bore. Using clamping means, the faces of this groove can be brought closer together in order to reduce the diameter of the bore and thus prevent the rod 26 from rotating.

In order to apply constant tension in the rod 26 and in order to return this rod to its rest position between two bending operations, the bench 4 advantageously has return means introducing tension into the rod along the central axis C. In the example illustrated, the return means comprise a compression spring 54. The spring 54 is intended to be compressed between an end stop of the sleeve 52 and a longitudinal end of the second frame 472. The sleeve 52 may locally have a cross section the periphery of which is circular, so as to accept a helical spring 54.

It is not necessary for the support 44 likewise to be fitted with a return spring. The rod 26 may thus be mounted in the articulation 46 using a sleeve not illustrated set into this articulation 46.

In FIG. 13, the rod 26 is at rest. The spring 54 may potentially apply tension in this position, in order to ensure that the rod 26 remains straight against the support at rest. Measuring the deformation of the rod 26 at rest may be carried out in order to determine the measurement offsets induced by this tension. In FIG. 14, bending is applied to the rod 26. Because of the elongation of that part of the rod that is present between the supports 44 and 45, the sleeve 52 undergoes a translational movement along the axis C toward the support 44. Thus, the spring 54 is compressed.

In the example illustrated in FIGS. 13 and 14, the rod return means are positioned at the articulation 47. However, other alternatives are also conceivable. In particular, it is possible to conceive of one of the supports 44 or 45 being mounted with the capability of translational movement along the axis C with respect to the ground, with the inclusion of return means.

Figure 15:
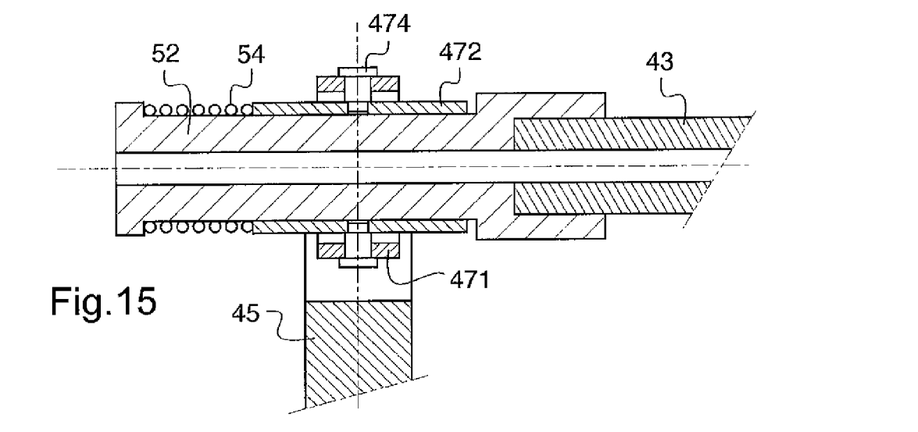
FIG. 15 is a side view in cross section of the support of FIG. 9, the rod being at rest and equipped with a protective sheath.
Figure 16:
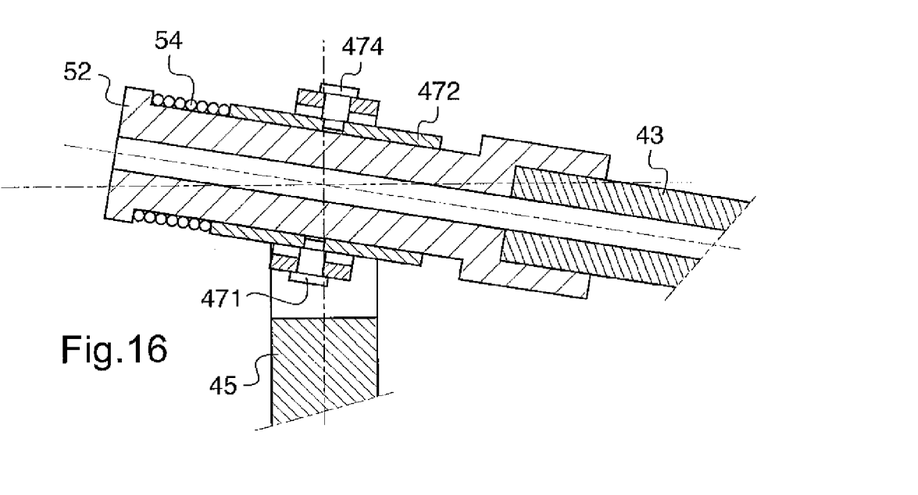
FIG. 16 is a side view in cross section of the support of FIG. 9, the rod being bent and equipped with a protective sheath.

FIGS. 15 and 16 depict an alternative for the holding of the rod 26 by the supports 44 and 45. In order to protect the rod 26, the latter is placed in a flexible sheath 43 which extends between the supports 44 and 45. The sleeve 52 houses one end of the sheath 43 and a shoulder forms an end stop for the translational movements of the flexible sheath 43 along the axis C. The flexible sheath 43 is immobilized in terms of rotation about the axis C by any appropriate means. The flexible sheath 43 has an inside diameter slightly greater than the outside diameter of the rod 26, the discrepancy between these two diameters having preferably to be smaller than 3 mm in order to minimize the differences in curvature between the flexible sheath 43 and the rod 26. Thus, for example, in the case where the calibration element 40 has a radius of curvature or bend radius of 5 m, in which the rod 26 has an outside diameter of 10 mm and in which the flexible sheath 43 has an inside diameter of 12 mm, the maximum difference in curvature between the rod 26 and the flexible sheath 43 is of the order of 0.00008 $m^{-1}$, which means that the calibration error associated with this difference is small in comparison with the target level of accuracy (+/−0.0015 $m^{-1}$). For preference, the flexible sheath 43 will be produced in such a way that friction with the rod 26 is reduced as far as possible. The inside diameter of the flexible sheath 43 may notably be coated with or made of a material that has a low coefficient of friction, such as polytetrafluoroethylene. In this example, the calibration element 40 comes into contact with the flexible sheath 43 in order to apply its bend radius or radius of curvature. Thus, the rod 26 is protected against contact with the element 40. As in the example of FIGS. 13 and 14, a return spring 54 is placed in compression between the sleeve 52 and the second frame 472 along the axis C. Means, not depicted, prevent the rod 26 from rotating about the axis C with respect to the flexible sheath 43. This degree of freedom in rotation about the axis C may, for example, be blocked by locally compressing the rod 26 against the sleeve 52 using removable clamping means.

In the embodiment using the flexible sheath 43, errors associated with the residual stresses can be corrected using elongation measurements when the rod returns to its straight position. Because of the presence of the sheath 43, the axial stresses in the rod will be relatively limited. Advantageously, an elongation measurement can be taken after the various angles of curvature applied to the rod. The elongation measurements will thus exhibit a certain degree of redundancy, guaranteeing that the residual stresses can be calculated accurately.

The processing means use the clusters of measurement points to determine, in a way known per se, sinusoidal functions of predetermined period, in this instance periods of 360° or $2\pi$ radians. Each function may notably be determined using an iterative least-squares method, for example setting the period of the sinusoidal function that is to be determined. Use of a high number of measurements introduces redundancy into the calibration of the monitoring device. The sinusoidal functions extrapolated from these measurements are therefore highly accurate, as errors of a Gaussian nature cancel one another out.

One method of calculating the sinusoidal function based on Fourier series is also described hereinbelow. This method is based on the breaking-down into Fourier series of a periodic function interpolating the measurement points.

Hereinafter, i will be the suffix for a bending measurement, i varying between 1 and n, n being the number of bending measurements taken. $\alpha_i$ will denote the angle of the plane of curvature for the measurement of suffix i.

This example will be based on bending measurements in planes of bending which are spaced apart by a fixed angular increment $\Delta\alpha$. $\Delta\alpha$ is thus defined by $\Delta\alpha=2\pi/n$ (in radians). $\alpha_i$ can thus be expressed as $\alpha_i=(i-1)*\Delta\alpha=(i-1)*2\pi/n$. Thus, for $\Delta\alpha=5°$ (in degrees), n=72. The use of planes of bending which are a fixed angle apart makes it easier to automate the calibration bench and allows the calculations involved in extrapolating the sinusoidal function to be simplified considerably.

The sinusoidal deformation function $\epsilon_j$ to be extrapolated for a sensor of suffix j will be expressed in the following form:

$$\varepsilon_j = A_{j0} + A_{j1}*\cos(\alpha) + B_{j1}*\sin(\alpha)$$

$$A_{j0} = \frac{1}{2\pi}\sum_{i=1}^{n}(\Delta\alpha*\varepsilon_{ji}) = \frac{1}{n}\sum_{i=1}^{n}\varepsilon_{ji}$$

$A_{j0}$ corresponds to an offset value for the sensor j, which value is associated on the one hand with the residual stresses involved in the bonding of the sensor j to the rod 26 and, on the other hand, with the tension applied by the return spring 54. If the calibration bench is equipped with a flexible sheath 43 that has a low coefficient of friction, $A_{j0}$ is essentially associated with the residual stresses involved in the bonding of the fibers.

$$A_{j1} = \frac{1}{\pi}\sum_{i=1}^{n}(\Delta\alpha*\varepsilon_{ji}*\cos\alpha_i) = \frac{\Delta\alpha}{\pi}\sum_{i=1}^{n}\varepsilon_{ji}*\cos\alpha_i = \frac{2}{n}\sum_{i=1}^{n}\varepsilon_{ji}*\cos\alpha_i$$

$A_{j1}$ is the phase component of the fundamental harmonic of the sensor j.

$$B_{j1} = \frac{1}{\pi}\sum_{i=1}^{n}(\Delta\alpha*\varepsilon_{ji}*\sin\alpha_i) = \frac{\Delta\alpha}{\pi}\sum_{i=1}^{n}\varepsilon_{ji}*\sin\alpha_i = \frac{2}{n}\sum_{i=1}^{n}\varepsilon_{ji}*\sin\alpha_i$$

$B_{j1}$ is the quadrature component of the fundamental harmonic of the sensor j.

$\epsilon_{ji}$ is the measurement of deformation of suffix i of the sensor of suffix j.

The sinusoidal function $\epsilon_j$ can also be expressed in the following form:

$$\epsilon_j = A_{j0} + D_{j1}*\cos(\alpha-\phi_j)$$

$\phi_j$ being the angular discrepancy between the sensor of suffix j and the sensor of suffix 1. $\phi$ is therefore zero. The value $D_{j1}$ is extrapolated from the values calculated before, as follows:

$$D_{j1} = \sqrt{A_{j1}^2 + B_{j1}^2}$$

And:

$$\phi_j = \text{Arctan}(B_{j1}/A_{j1}) \text{ if } A_{j1} \neq 0$$

$$\phi_j = \pi/2 \text{ si } A_{j1}=0$$

Figure 17:
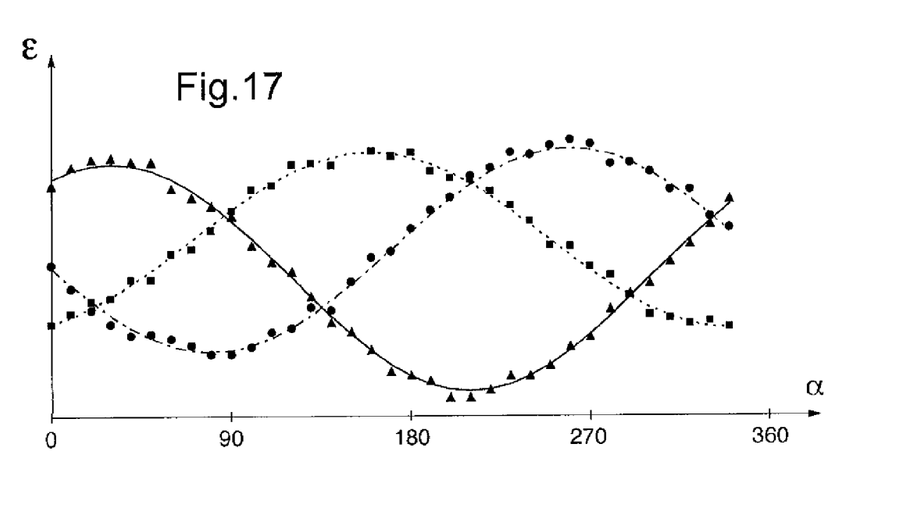
FIG. 17 depicts sinusoidal curves extrapolated from a cluster of measurement points from the monitoring device.

FIG. 17 represents clusters of deformation measurement points obtained during a calibration cycle, and sinusoidal functions extrapolated from these points. The respective deformations $\epsilon_1$, $\epsilon_2$, $\epsilon_3$ of the fibers 30 are thus expressed in the form of sinusoidal functions of the following form:

$$\epsilon_1 = D_{11}\cos(\alpha) + A_{10}$$

$$\epsilon_2 = D_{21}\cos(\alpha-\phi_2) + A_{20}$$

$$\epsilon_3 = D_{31}\cos(\alpha-\phi_3) + A_{30}$$

The terms $D_{11}$, $D_{21}$ and $D_{31}$ allow the actual dimensions r1, r2, r3 depicted in FIG. 2 to be calculated because:

$$r_1 = R*D_{11}$$

$$r_2 = R*D_{21}$$

$$r_3 = R*D_{31}$$

R being the curvature applied to the center C of the rod 26 by the calibration element 40. This parameter is therefore preknown.

The phase shifts $\phi_2$ and $\phi_3$ between the sinusoids are respectively equal to the angular dimensions $\phi_2$ and $\phi_3$ depicted in FIG. 2.

The terms $A_{10}$, $A_{20}$ and $A_{30}$ are associated with the residual bonding stresses as was explained earlier on.

In order to improve the calibration accuracy, sinusoidal functions can be extrapolated for measurements taken at other bend radii, using calibration elements with different bend radii.

This method of calibration can naturally be applied to a rod comprising a number of optical sensors in excess of 3, for example a rod comprising four fibers like the one disclosed in publication OTC19051 referenced earlier.

In that case, on completion of a calibration cycle there are as many clusters of deformation measurement points and as many sinusoids that extrapolate these points as there are optical sensors. The half-amplitude $D_{j1}$ of each sinusoid number j can be used to determine the distances rj separating the corresponding optical sensor from the central axis C of the deformable rod ($r_j=R*D_{j1}$). The phase shift $\phi_j$ between sinusoid number j and sinusoid number 1 is equal to the corresponding angular dimension between optical sensor number j and optical sensor number 1.

Such a calibration method makes it possible to obtain accurate calibration of the monitoring device, even when there are other sources of spread present, such as a flexible protective sheath surrounding the rod 26. The calibration data are stored in memory in the device that performs the real-time signal processing of the optical signals from the various sensors when the monitoring device is in service. The actual dimensions calculated using such a calibration method guarantee that the curvatures will be calculated very accurately.

To illustrate these calculations, let us consider the example of a rod comprising three optical sensors of the kind shown in FIG. 2, and which has previously been subjected to the calibration method that forms the subject of the present application. The actual dimensions r1, r2, r3, $\phi2$ and $\phi3$ have therefore been determined accurately. In addition, the offsets $\epsilon1r$, $\epsilon2r$, $\epsilon3r$ on the measurements of elongation associated with the residual stresses have also been determined when the rod was laid out straight and at rest using the method described above. When the rod is in service, the three optical sensors supply, at constant time intervals, for example every tenth of a second, three elongation measurements $\epsilon1$, $\epsilon2$, $\epsilon3$. From these three elongation measurements it is necessary to calculate the three unknowns which are the radius of curvature or bend radius $\rho$ of the rod, the angular orientation $\psi$ of the plane of bending with respect to the rod, and finally the uniform axial elongation $\epsilon$ of the rod. In practice, this amounts to solving the following system of equations:

$$\epsilon1 = \epsilon1r + \epsilon + (r1/\rho)\cos(\psi)$$

$$\epsilon2 = \epsilon2r + \epsilon + (r2/\rho)\cos(\psi-\phi2)$$

$$\epsilon3 = \epsilon3r + \epsilon + (r3/\rho)\cos(\psi-\phi3)$$

This system of three equations with three unknowns can be solved analytically, for example by starting off with a calculation of the angle $\psi$, as follows:

$$\tan(\Psi) = \frac{-L + M\frac{\varepsilon'_1/2 + \varepsilon'_3/2 - \varepsilon'_2}{\varepsilon'_1 - \varepsilon'_3}}{K + N\frac{\varepsilon'_1/2 + \varepsilon'_3/2 - \varepsilon'_2}{\varepsilon'_1 - \varepsilon'_3}}$$

With:

$\varepsilon'1 = \varepsilon_1 - \varepsilon_{1r}$ $\varepsilon'2 = \varepsilon_2 - \varepsilon_{2r}$ $\varepsilon'3 = \varepsilon_3 - \varepsilon_{3r}$ $\beta 2 = \varphi 2 - \pi/2$ $\beta 3 = \varphi 3 - \pi$ $K = r_2 \cos(\beta_2) + \frac{r_3 \sin(\beta_3)}{2}$ $L = r_2 \sin(\beta_2) + \frac{r_1 - r_2 \cos(\beta_3)}{2}$ $M = r_1 + r_3 \cos(\beta_3)$ $N = r_3 \sin(\beta_3)$ Once the angle $\psi$ has thus been calculated, it is possible from this to deduce the radius of curvature or bend radius $\rho$ as follows:

$$\rho = \frac{K \sin(\Psi) + L \cos(\Psi)}{\varepsilon'_1/2 + \varepsilon'_3/2 - \varepsilon'_2}$$

Finally, once $\psi$ and $\rho$ have been calculated, the uniform axial elongation can easily be deduced:

$\epsilon = \epsilon_1 - \epsilon_{1r} - (r1/\rho)\cos(\psi)$

These calculations can be performed at a very high speed by a microprocessor of a power that is commonplace at the present time. In practice, the computation times are negligible by comparison with the elongation measurement times. It is thus possible for several hundreds of curvatures to be measured per second in real time.

Because of the marked improvement in the accuracy of the monitoring device, a lower number of such devices can be mounted on a bend stiffener or a construction without greatly detracting from the accuracy of the measurements taken.

As far as the calibration method is concerned, it would also be possible to determine harmonics of higher rank, on the basis of these same measurements. Depending on the ratio between the amplitude of these harmonics and the amplitude of the fundamental harmonic, it will be possible to determine whether the quality of the calibration is sufficient for accurately determining the actual dimensions of the rod.

Using the method detailed previously which is based on Fourier series, it is notably possible to calculate the main harmonics of rank greater than 1, for example the odd-numbered harmonics of ranks between 3 and 11, and compare them against the fundamental (rank 1) harmonic by calculating a harmonic content equal to the ratio between, on the one hand, the harmonic mean of the amplitudes of the harmonics of rank greater than 1 and, on the other hand, the amplitude of the fundamental harmonic. If this harmonic content exceeds a certain threshold value, that means that the corresponding cluster of points is too remote from a sinusoid and that there has probably been a problem during the calibration cycle (for example an articulation or a return spring has become jammed). In this case, the calibration bench will automatically demand that the mechanical fixings be checked and a bending measurement cycle repeated.

Although the invention has been described in particular with reference to the use of optical sensors formed of Bragg gratings, other known optical sensors may be used, for example scattered axial deformation measurement sensors using a Brillouin reflectometry method.

The invention claimed is:

1. A method of calibrating a device for monitoring the curvature of a structure, wherein the monitoring device comprises a deformable rod having a central axis and having a peripheral, at least three optical sensors pressed against the periphery of the rod, the sensors being spaced apart around the periphery of the rod;
the method comprising steps of:
for various successive orientations of planes of bending about the central axis:
bending the rod to the same bend radius;
measuring the deformation of the sensors, during the bending;
extrapolating, from the measured deformations, a sinusoidal function of the deformation for each sensor as a function of the orientation of the plane of bending;
calculating error correction coefficients as a function of the angular offset between the extrapolated sinusoidal functions and as a function of the amplitudes of the extrapolated sinusoidal curves.

2. The calibration method as claimed in claim 1, wherein the structure is a marine flexible pipe bend stiffener.

3. The calibration method as claimed in claim 1, wherein the calibrating of the error correction coefficients comprises calculating the actual positions of the at least three optical sensors with respect to the central axis as a function of the amplitudes of the extrapolated sinusoidal curves.

4. The calibration method as claimed in claim 1, further comprising returning the rod to a substantially straight position after each bending operation.

5. The calibration method as claimed in claim 1, further comprising bending the rod by pressing a calibration element of predefined curvature against its periphery.

6. The calibration method as claimed in claim 5, further comprising preventing the rod from rotating with respect to its central axis, while mounting the calibration element to be rotatable about the central axis.

7. The calibration method as claimed in claim 5, further comprising holding the rod in a position by two supports, pressing the calibration element against the rod between the supports, wherein the supports allow the rod to pivot about the two axes which are substantially perpendicular to the central axis of the rod.

8. The calibration method as claimed in claim 1, wherein each optical sensor comprises a length of optical fiber comprising a Bragg grating, and the method comprises pressing the optical fiber against the periphery of the rod.

9. The calibration method as claimed in claim 8, wherein the Bragg gratings of the various lengths of fiber are arranged at the same level along the central axis of the rod.

10. The calibration method as claimed in claim 9, wherein the bending of the rod is applied in a region of the fibers at the Bragg gratings.

11. The calibration method as claimed in claim 1, wherein the extrapolation of the sinusoidal function of a sensor establishes a function of the type:

$\epsilon_j = A_{j0} + A_{j1}*\cos(f) + B_{j1}*\sin(\alpha)$, wherein $A_{j1}$ is the phase component and $B_{j1}$ is the quadrature component of the fundamental harmonic, wherein the components are determined by a Fourier series method on the basis of the deformation measurements, and a is the orientation of the plane of bending about the central axis.

12. The calibration method as claimed in claim 11, wherein at least one harmonic of a rank higher than a fundamental harmonic is determined by a Fourier series method, and the deformation measurements are repeated if the ratio between the higher rank harmonic and the fundamental harmonic exceeds a threshold value.

* * * * *